(12) United States Patent
Abhari

(10) Patent No.: US 9,346,930 B2
(45) Date of Patent: May 24, 2016

(54) LOW COST PROCESS FOR MANUFACTURE OF FORM-STABLE PHASE CHANGE MATERIAL

(71) Applicant: REG SYNTHETIC FUELS, LLC, Ames, IA (US)

(72) Inventor: Ramin Abhari, Bixby, OK (US)

(73) Assignee: REG SYNTHETIC FUELS, LLC, Ames, IA (US)

( * ) Notice: Subject to any disclaimer, the term of this patent is extended or adjusted under 35 U.S.C. 154(b) by 0 days.

(21) Appl. No.: 14/754,267

(22) Filed: Jun. 29, 2015

(65) Prior Publication Data

US 2015/0299416 A1     Oct. 22, 2015

Related U.S. Application Data

(63) Continuation of application No. 13/223,122, filed on Aug. 31, 2011, now Pat. No. 9,102,080.

(60) Provisional application No. 61/379,252, filed on Sep. 1, 2010.

(51) Int. Cl.
| | |
|---|---|
| *B29B 9/12* | (2006.01) |
| *C08K 3/04* | (2006.01) |
| *C08J 3/00* | (2006.01) |
| *C09K 5/06* | (2006.01) |
| *B29B 9/06* | (2006.01) |

(52) U.S. Cl.
CPC ... *C08K 3/04* (2013.01); *B29B 9/12* (2013.01); *C08J 3/005* (2013.01); *C09K 5/06* (2013.01); *B29B 9/065* (2013.01); *C08J 2323/06* (2013.01); *C08J 2491/06* (2013.01); *C08K 2003/045* (2013.01)

(58) Field of Classification Search
USPC .......................................... 264/140–143, 211
See application file for complete search history.

(56) References Cited

U.S. PATENT DOCUMENTS

| | | |
|---|---|---|
| 4,547,536 A | 10/1985 | Nabors |
| 4,908,166 A | 3/1990 | Salyer |
| 4,992,605 A | 2/1991 | Craig et al. |
| 5,053,446 A | 10/1991 | Salyer |
| 6,238,732 B1 | 5/2001 | Cameron et al. |
| 6,793,856 B2 | 9/2004 | Hartmann et al. |

(Continued)

FOREIGN PATENT DOCUMENTS

SG            172045         11/2012

OTHER PUBLICATIONS

"Crosslinking," Encyclopedia of Polymer Science and Technology, vol. 4, 1966, pp. 331-414.

(Continued)

*Primary Examiner* — Jacob Thomas Minskey
(74) *Attorney, Agent, or Firm* — Foley & Lardner LLP; James P. McParland; Joseph P. Meara

(57) ABSTRACT

The present technology generally relates to phase change material (PCM) pellets consisting essentially of a mixture of paraffin, a polymer, and optionally a thermal conductivity improver, a nucleating agent, an anti-oxidant, or a combination of any two or more thereof; wherein the paraffin is at least about 60 wt % of the PCM pellet; and the polymer is uncrosslinked high density polyethylene (HDPE) that has a melt flow index between about 0.1 g/10 min and about 50 g/10 min.

27 Claims, 1 Drawing Sheet

(56) References Cited

U.S. PATENT DOCUMENTS

| | | | |
|---|---|---|---|
| 7,524,379 | B2 | 4/2009 | Bailey et al. |
| 7,563,398 | B2 | 7/2009 | Hartmann et al. |
| 8,231,804 | B2 | 7/2012 | Abhari |
| 8,329,078 | B2 | 12/2012 | Gueret et al. |
| 2002/0105108 | A1 | 8/2002 | Hartmann et al. |
| 2005/0035482 | A1 | 2/2005 | Hartmann et al. |
| 2006/0124892 | A1 | 6/2006 | Rolland et al. |
| 2008/0312480 | A1 | 12/2008 | Dindi et al. |
| 2010/0151535 | A1 | 6/2010 | Franklin et al. |
| 2010/0196641 | A1 | 8/2010 | De Vos et al. |
| 2011/0169179 | A1 | 7/2011 | Gueret et al. |
| 2011/0224299 | A1 | 9/2011 | McNamara et al. |

OTHER PUBLICATIONS

"Ethylene Polymers," Encyclopedia of Polymer Science and Technology, vol. 6, 1967, pp. 275-331.

ASTM D1238-85, "Standard Test Method for Flow Rates of Thermoplastics by Extrusion Plastometer," ASTM International, 1985, pp. 1-13.

ASTM D2765-95, "Standard Test Methods for Determination of Gel Content and Swell Ratio of Crosslinked Ethylene Plastics," ASTM International, 1996, pp. 1-7.

Beare-Rogers, J. et al, "Lexicon of Lipid Nutrition," Pure and Applied Chemistry, vol. 73, No. 4, 2001, pp. 685-744.

Billmeyer, F.W., Textbook of Polymer Science, Third Ed., 1984, pp. v, 40-43.

Catalysts in Petroleum Refining & Petrochemicals Program Listing, 16th Saudi-Japanese Symposium, http://www3.kfupm.edu.sa/catsymp/Symp 16th/Program.htm, accessed Sep. 9, 2013.

Connor, et al., "Hydrogenolysis of Oxygenated Organic Compounds," J. Am. Chem. Soc., 54(12), 1932, pp. 4678-4690.

Craig, et al., "A Marketing Survey of Worldwide Potential for Use of Vegetable Oil Conversion Products in Diesel Fuel," Saskatchewan Research Council, Oct. 1989 (182 pages).

Final Office Action in U.S. Appl. No. 13/223,122 dtd Aug. 14, 2013 (13 pages).

Final Office Action in U.S. Appl. No. 13/223,122 dtd Nov. 25, 2014 (10 pages).

Food Fats and Oils, Inst. of Shortening and Edible Oils, 335-354 (9th Ed. 2006).

Gosselink, et al., "Mild Hydrotracking: Coping with Catalyst Deactivation," 34 Catalyst Deactivation, 279-287 (1987).

Gusmao et al., "Utilization of Vegetable Oils as an Alternative Source for Diesel-Type Fuel," Catalysis Today, 5, 1989, pp. 533-544.

Iki, et al., "Applicability of Hydrogenated Palm Oil for Automotive Fuels", 16th Saudi Arabia-Japan Joint Symposium, Dhahran, Saudi Arabia, Nov. 5-6, 2006, 10 pages.

Kubicka, et al., "Transformation of Plant Oils to Hydrocarbons," APROCHEM 2007, 1149-1155, Apr. 16-18, 2007.

N-dodecane Compound Summary, PubChem, National Center for Biotechnology Info., Sep. 16, 2004, http://pubchem.ncbi.nlm.nih.gov/summary/summary.cgi?cid=8182#x27.

Non-Final Office Action in U.S. Appl. No. 13/223,122 dtd Mar. 19, 2014 (13 pages).

Non-Final Office Action in U.S. Appl. No. 13/223,122 dtd May 24, 2013 (13 pages).

Notice of Allowance in U.S. Appl. No. 13/223,122 dated May 21, 2015 (8 pages).

N-tetradecane Compound Summary, PubChem, National Center for Biotechnology Info., Sep. 16, 2004, http://pubchem.ncbi.nlm.nih.gov/summary/summary.cgi?cid=12389#x27.

Sharma, B.K., "Plastics," Industrial Chemistry (Including Chemical Engineering), 2013, p. 879.

Simacek, et al., "Hydroprocessed rapeseed oil as a source of hydrocarbon-based biodiesel", Fuel 88, 2009, 456-460.

Smejkal, et al., "Thermodynamic balance in reaction system of total vegetable oil hydrogenation", Chemical Engineering Journal 146 (2009) 155-160.

Smejkal, et al., Bibliographic Data for: "Thermodynamic balance in reaction system of total vegetable oil hydrogenation", Chemical Engineering Journal 146 (2009) 155-160.

Song, et al., Temperature Programmed Retention Indices for GC and GC-MS of Hydrocarbon Fuels and Simulated Distillation GC of Heavy Oils, Analytical Advances for Hydrocarbon Research, 147-210, 2003.

Standard Methods for the Analysis of Oils, Fats and Derivatives, 6th Ed., Part 1, pp. 96-108 (Pergamon Press 1979).

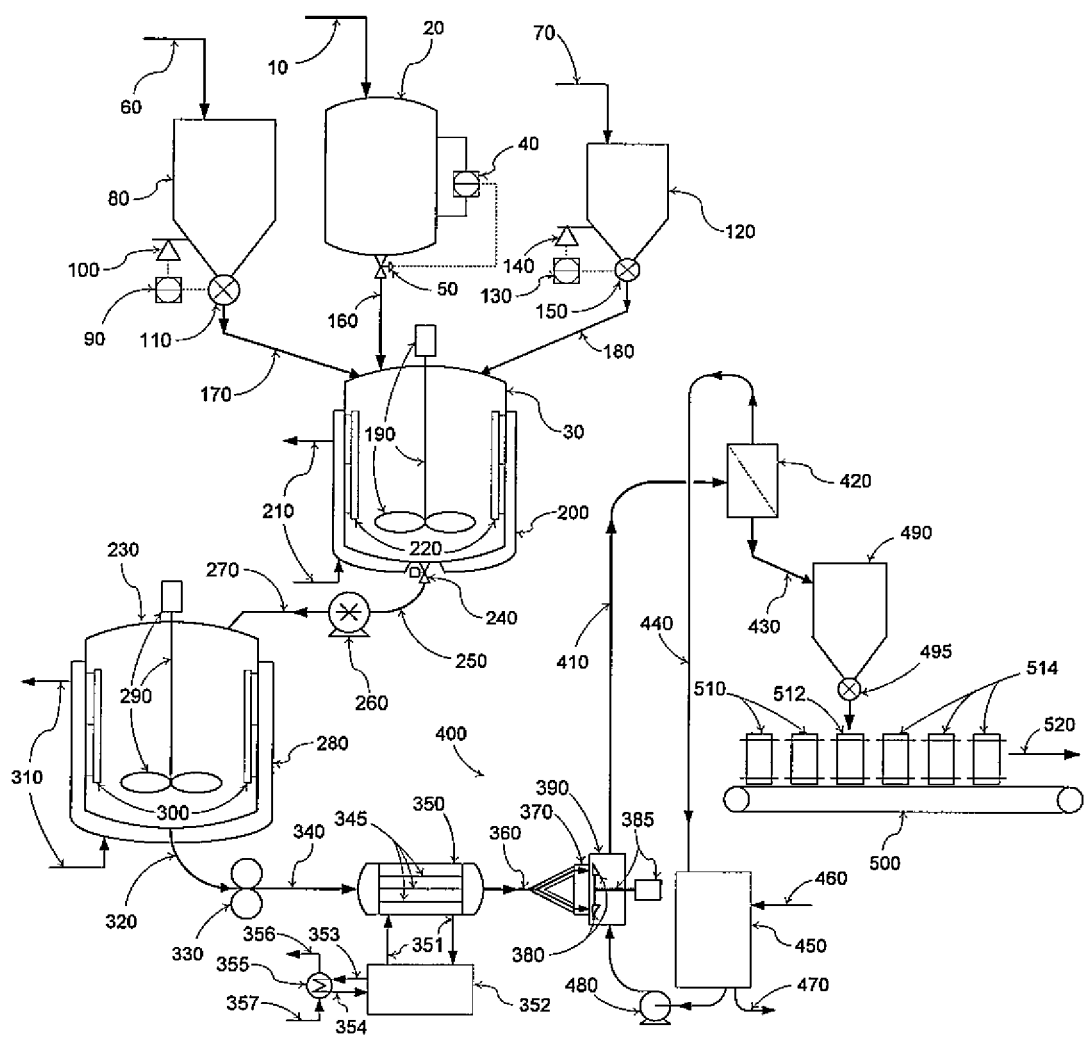

LOW COST PROCESS FOR MANUFACTURE OF FORM-STABLE PHASE CHANGE MATERIAL

CROSS-REFERENCE TO RELATED APPLICATIONS

The present application is a continuation of U.S. application Ser. No. 13/223,122, filed Aug. 31, 2011, which claims benefit under 35 U.S.C. §119(e) of U.S. Provisional Application No. 61/379,252, filed Sep. 1, 2010, which are each hereby expressly incorporated herein by reference in their entirety.

STATEMENT REGARDING FEDERALLY SPONSORED RESEARCH OR DEVELOPMENT

Not applicable.

BACKGROUND OF THE INVENTION

The present invention relates generally to a method for making phase change material, and more particularly, but not by way of limitation, to a low-cost, continuous method of manufacturing form-stable phase change material.

Published reports show that incorporation of paraffinic Phase Change Material (PCM) in building envelopes (wall boards, attic insulation, etc.) can reduce energy consumption by 20+%.

Although paraffins with melting points between 10° C. to 50° C. have all found specialty passive energy storage applications (ranging from clothing to spacecraft thermal systems), the paraffins of interest for building envelopes are those that undergo solid-liquid phase change (melting and freezing) at indoor comfort temperatures (generally between 18° C. and 28° C., or between 64° F. and 82° F.). Such paraffins are also referred to as wax.

Relatively large amounts of energy are stored during paraffin phase change (about 100 to about 240 J/g), thus reducing the peak energy demand for cooling (summer) and heating (winter).

Paraffins offer advantages over other types of PCM due to thermo-oxidative stability and material compatibility (i.e. non-corrosive).

Paraffin wax has traditionally been encapsulated for PCM use, mainly to prevent leakage of paraffin when it is in melt phase. A PCM product that keeps its form whether in solid or melt phase is referred to as form-stable PCM. Other methods of making form-stable PCM involve filling small cups (or other container) with the PCM, capping the filled cups, and incorporating them into building construction material.

Encapsulation is a costly batch process often involving use of toxic monomers. Similarly, filling and capping containers can be labor intensive and inefficient for mass production.

Given the current state of PCM manufacturing technology, PCM products have been too expensive and not broadly available. As such, despite demonstrated potential for improving energy efficiency of residential and commercial buildings, PCM products have not penetrated this, or other cost-focused segments of industry.

Recent studies have shown that form-stable PCMs can be formed by mixing paraffins with high density polyethylene (HDPE). However, there has been no suggestion of how these form-stable PCMs can be manufactured commercially.

To this end, there is a need for a low cost continuous process to manufacture form-stable PCMs. It is to such a process of manufacturing form-stable PCMs that at least one embodiment of the present invention is directed.

The process uses equipment that is well-suited for automated, high production rate, low cost operation.

PCM pellets are similar in form to more costly microencapsulates. Specifically, the pellets are relatively small in size and therefore, have a high surface area to volume ratio for increased heat transfer rate.

SUMMARY OF THE INVENTION

The present invention generally relates to a method for manufacturing phase change material (PCM) pellets. The method includes providing a melt composition including paraffin and a polymer. The paraffin has a melt point between about 10° C. and about 50° C., and more preferably between about 18° C. and about 28° C. The paraffin has a heat of fusion between 100 and 240 J/g. The paraffin is at least 60 wt % of the melt composition. The paraffin includes n-octadecane. In one embodiment, the polymer is high density polyethylene (HDPE). The HDPE has a melt flow index between about 0.1 g/10 min and about 20 g/10 min.

In one embodiment, the melt composition includes various additives, such as a flame retardant.

The method further includes forming the melt composition into PCM pellets in a pelletizer. In one embodiment, an underwater pelletizer may be utilized. The pelletizer water temperature is between the melting point of the paraffin and the melting point of the polymer. In another embodiment, a strand pelletizer may be utilized. The strand pelletizer trough water temperature is between the melting point of paraffin and the melting point of the polymer. Any type of pelletizer may be utilized so long as it functions in accordance with the present invention as described herein.

The size of the PCM pellets is between about 0.5 mm and about 2 mm. The PCM pellets may be incorporated into wallboards, attic insulation, items of clothing, and footwear.

The method further may include the step of cooling the melt composition to increase the melt viscosity to 4,000 cP or higher before pelletizing.

BRIEF DESCRIPTION OF THE DRAWINGS

FIG. 1 is a schematic diagram of an operation of a process according to the present invention.

DETAILED DESCRIPTION OF THE INVENTION

One embodiment of the invention is presented in FIG. 1. A paraffin wax 10 is transferred to a wax storage tank 20. Paraffin wax 10, for example, is a normal paraffin having a carbon number between 14 and 22. For example, paraffin includes 60-100 wt % n-octadecane, and has a melting point between about 50° F. (10° C.) and about 122° F. (50° C.), preferably between about 64° F. (18° C.) and about 82° F. (28° C.). The paraffin has a heat fusion between about 100 and 240 J/g. The paraffin wax may be obtained from a number of chemical and refining operations such as Fischer-Tropsch synthesis, ethylene oligomerization followed by hydrogenation of $C_{14}$-$C_{22}$ linear olefins, or via mole sieve separation from petroleum fractions. A bio-based process for production of n-paraffins involves hydrodeoxygenation of lipids using a hydrogenation catalyst having hydrogenolysis and olefin saturation activity. The lipid fatty acid/ester oxygen atoms are removed and double-bonds therein saturated. In a preferred embodiment, the octadecane-rich wax composition is the product of hydrodeoxygenation of lipids such as canola oil.

The paraffin wax 10 is transferred to a mix tank 30 where it is mixed with other ingredients for pelletizing. A level transmitter 40 and an automatically activated valve 50 are used to ensure the proper amount of paraffin wax is introduced to the mix tank 30. Paraffin wax storage tank 20 is typically located at a higher elevation than the mix tank 30, thus allowing for gravity flow of the paraffin. In some embodiments, a pump is used to transfer the contents of the storage tank 20 to the mix tank 30. The other mix components include a polymer 60 and an additive composition 70.

The polymer 60 is, for example, a high density polyethylene (HDPE) powder. The polymers have a molecular weight greater than 100,000 and are compatible with the paraffin wax, or have at least one wax-compatible phase. Some polymers have flame retardant properties which is useful when the PCM is used in building and construction applications. Examples of such polymers include halogenated or halogen-modified polymers, or those additized with flame-retardants. A preferred polymer is HDPE having melt flow index (or melt flow rate) less than 50 g per 10 minutes. Melt flow index (MFI) is a measure of the polymer's molecular weight and melt viscosity; the higher the molecular weight and melt viscosity, the lower its MFI. The most preferred polymer is HDPE having MFI values between about 0.1 g/10 min and about 20 g/10 min. However, it should be understood by one of ordinary skill in the art that various polymers may be utilized so long as the polymer functions in accordance with the present invention as described herein.

The polymer 60 is loaded into a hopper 80, from where required amounts for PCM compounding are transferred to the mix tank 30 using a mass flow control loop 90 including a load cell 100 and solids flow valve 110. Typically, hopper 80 is at a higher elevation than the mix tank 30, thus allowing for gravity flow of polymer 60 through conduit 170. If hopper 80 is not at a higher elevation, pneumatic transport, screw conveyor, or bucket elevators may be used to transfer the contents to the mix tank 30.

The additive composition 70 is optionally added to the mix tank 30 to enhance the PCM pellet performance. The additive composition 70 is a solid (powder or flake) blend including a thermal conductivity improver, a nucleating agent, an antioxidant, and/or a flame retardant. Thermal conductivity improvers are optionally added to increase the rate of heat transfer from the PCM pellet walls to the paraffin clusters trapped therein. Prior art teaches use of expandable graphite, graphite microfiber pieces, or graphite powder for this purpose. It should be understood by one of ordinary skill in the art that any material having thermal conductivities higher than the polymer and the wax—for example, in microfiber form—may be used as the thermal conductivity improver.

Nucleating agents include organic and inorganic material that can form a site for crystal growth, thus preventing sub-cooling or reducing the extent of sub-cooling. Sub-cooling is when a molten material does not freeze when cooled to its melting point, but several degrees lower. The nucleating agents suitable for use in PCM pellets include inorganic salts, such as sodium and calcium chloride, or organic compounds having a higher melting point than the paraffin, but with a similar alkyl group. A suitable organic nucleating agent for the present invention includes 1-octadecanol. It should be noted that 1-octadecanol is also a reaction intermediate during hydrodeoxygenation of vegetable oils to paraffins, and thus, may be present in n-octadecane produced via hydrodeoxygenation.

Antioxidants/stabilizers include hindered phenols, phosphites, and hydroxylamines. Flame retardants include halogenated organic compounds, as well as organo-antimony and organo-phosphorus compounds. Antioxidant/stabilizers are added mainly to protect the polymer and wax from degradation at high compounding temperatures (e.g. in the mix tank 30, or an extruder).

The additives that include the additive composition 70 may be in the form of a master-batch. As such, the additive composition 70 is placed in an additive holding and transfer vessel 120. If the components that include additive composition 70 are not pre-blended as a master-batch, individual holding and transfer vessels for each component will be required such that they can be dosed individually to the mix tank 30. The amount (defined below) of additive composition 70 is transferred to the mix tank 30 using a mass flow control loop 130, including a load cell 140 and solids flow valve 150. Typically, vessel 120 is at a higher elevation than the mix tank 30, thus allowing for gravity flow of solids additive composition 70 through conduit 180. If vessel 120 is not at a higher elevation, pneumatic transport, screw conveyor, or bucket elevators may be used to transfer the contents to the mix tank 30. The rate of transfer of solids through conduits 170 and 180 may need to be controlled (through control loops 90 and 130, respectively) to ensure that the solids are well-dispersed and/or melted.

The paraffin wax, the polymer, and the additives are then charged to the mix tank 30 through conduits 160, 170, and 180, respectively. The order of addition depends on the type of equipment used as the mix tank 30. The mix tank 30 may be a viscous melt batch mixer (e.g. Banbury or Henschel mixers) or a continuous extruder. The extruder may be a single-screw mixer, a twin screw co-rotating mixer, or a counter-rotating mixer. In the embodiment of FIG. 1, the mix tank 30 is shown as a heated vessel equipped with a mixing device appropriate for the relatively high viscosity polymer melt composition. For this system, the polymer and additive are added to the pool of molten wax. A mix tank agitator 190, including a motor, shaft, and propeller blade, is kept on during addition of all ingredients. The paraffin wax 10 and polymer 60 are charged at a ratio (paraffin:polymer) of from about 50:50 to 90:10, preferably from 60:40 to 80:20. The additives 70 are then dosed through a conduit 180. The additive composition 70 and dosing level are such that the amount of nucleating agent in PCM paraffin is from about 0 to about 10 wt %, the thermal conductivity improver is from about 0 to about 2 wt %, the flame retardant is from about 0 to about 10 wt %, and the anti-oxidant is from about 0 to about 0.1 wt %.

In order to ensure a homogenous molten composition is achieved, the mix tank 30 is equipped with a jacket 200 wherein a heat transfer fluid 210 circulates. The mix tank 30, agitator 190, and baffles 220 assist with heat transfer from the mix tank 30 walls to its contents. The heat transfer fluid 210 is supplied from a hot oil system (not shown), including a storage and expansion tank system with electric or direct-fired heating, and with a recirculation pump. The hot oil system is designed to maintain the mix tank 30 temperature between about 250° F. and about 550° F.

The homogeneous molten PCM composition prepared in the mix tank 30 is transferred to a pelletizer feed tank 230. When a continuous mixer such as an extruder is used, the pelletizer feed tank 230 is not required. For the mix tank 30, the transfer is achieved by opening the block valve 240 and turning on pump 260 and thus, the molten PCM composition flows through conduits 250 and 270. Any number of pump types known to those having ordinary skill in the art may be selected for use as pump 260 based on the transfer temperature and corresponding PCM compound melt properties such as density and viscosity. Examples of pump types include positive displacement (gear, lobe, screw, diaphragm) and centrifugal. Preferred pumps for the transfer of liquids have viscosities in the 10,000 to 300,000 cP include gear, screw, and lobe pumps.

The pelletizer feed tank 230 includes many of the same features of the mix tank 30 such as an agitator system 290, baffles 300, and vessel jacket 280. Furthermore, as with the mix tank 30, heat transfer fluid 310 (as described previously herein) is allowed to circulate through vessel jacket 280 to maintain the PCM molten composition at desired temperature of from about 250° F. to about 550° F. When the volume of pelletizer feed gets low, a new batch of molten PCM compound is prepared in the mix tank 200 and is transferred to the pelletizer feed tank 230.

The molten pelletizer feed tank PCM composition is transferred through conduit 320 to a gear pump 330 where it is pressurized and transferred to an optional melt cooler 350 through conduit 340. Conduit 340 pressure is in the 200 to 2,000 psig range, depending on the melt viscosity and flow restriction provided by the apparatuses downstream. The molten PCM is cooled in melt cooler 350 to cooled PCM melt 360. The temperature of the cooled PCM melt 360 is from about 200° F. to about 400° F. The purpose of cooling the melt is to raise its viscosity to at least about 4,000 cP. This ensures that extrudates of this melt, formed by pressuring the melt through orifice holes, have sufficiently high melt strength to be cut. When the molten PCM compound 250 has a viscosity higher than 4,000 cP, preferably above 10,000 cP, the melt cooler 350 is not required.

The melt cooler 350 is a shell and tube heat exchanger. The PCM melt flows through the tubes 345 while a heat transfer fluid (HTF) 351 flows through the shell. Static mixer elements are inserted in the tubes 345 thereby improving heat transfer. Without static mixer elements, or similar tube internals, heat transfer coefficients would be low due to laminar flow of the PCM compound. As a result, a prohibitively large heat transfer surface would be required. Lacking provisions for improving heat transfer coefficient with laminar flow through tubes 345 also necessitates lower shell side temperatures which, in turn, may cause PCM freeze-off on the tube 345 walls.

The HTF temperature is controlled in a heat transfer fluid unit 352. The HTF temperature is controlled to be higher than the melting point of the crystalline polymer in the PCM compound. For paraffin/HDPE PCM compounds, the HDPE polymer has a melting point of about 250° F. (120° C.). Typical HTF temperatures are in the 250° F. to 350° F. range, preferably between about 260° F. and about 300° F. The temperature of the HTF is thus controlled to be higher than the melting point of the polymer to ensure that no PCM components freeze on the walls of tubes 345 as the PCM is being cooled. The HTF temperature is controlled via circulation through a HTF cooler 355. The HTF cooler 355, in turn, uses cooling water for cooling the HTF as needed for temperature control purposes. In this embodiment, cooling water is supplied through conduit 357, removing some of the heat from the HTF, and returning cooling water through conduit 356. The HTF unit 352 is also equipped with heating capability either through a gas or liquid fuel fired heater or an electric heating element (not shown).

The pressurized and optionally cooled PCM stream 360 enters an underwater pelletizer assembly 400 including a die 370, rotating knives 380, and a water chamber 390. The die 370 is circular in shape and includes a plurality of orifice holes, arranged in a circular pattern. Depending on PCM throughput, the die 370 may have between 10 and 1000 holes. In some embodiments, the die 370 is heated (e.g. by an electric band heater) to prevent freeze-off of molten PCM in the holes.

The rotating knives 380 are set flush against the face of the die 370 in the water chamber 390. The rotating knives 380 are supported by a shaft and motor assembly 385, with the motor outside the water chamber 390. As the molten PCM extrudate exits the die 370, it is cut by rotating knives 380 under water. The cut pieces of molten PCM extrudate form into pellets, which are rapidly cooled and carried by water through a pellet slurry pipe 410 (wherein additional pellet cooling takes place in the 1 to 10 second residence time provided by the pipe 410) to a spin dryer 420. Therein, PCM pellets 430 are separated from water and air-dried while spin dryer water 440 enters a pelletizer water tank 450. The pelletizer water tank 450 is equipped with makeup line 460 and purge line 470, to maintain tank level and water quality. The purge water in line 470 contains pellet fines and components in the PCM compound which may have migrated into the water phase. As such, the purge water is directed to filtration and/or water treatment (not shown).

In some embodiments, the pelletizer water tank 450 is equipped with coils (not shown) for controlling the water temperature. In general, pelletizer water temperature best suited for pelletizing PCM according to the present invention is between about 70° F. to about 200° F. The water temperature is at a temperature between the melting point of the paraffin and the melting point of the polymer. Pelletizer water of fairly constant temperature and quality is thus circulated through the water chamber 390 through a pump 480. Pump 480 is preferably a centrifugal pump sized to provide turbulence in the water chamber 390 and the pellet slurry pipe 410.

Although an underwater pelletizer is described in this embodiment of the invention, it should be recognized by those skilled in the art that other pelletizers may be used so long as the pelletizer functions in accordance with the present invention as described herein. For example, a strand pelletizer may be used, wherein the molten extrudates are pulled as strands through a water trough where they are partially or completely solidified before being chopped into pellets. Whereas the pellets formed in an underwater pelletizer are typically spherical, those formed in a strand pelletizer are typically cylindrical. Nevertheless, the size of both types of pellets may be given by an equivalent diameter. For non-spherical pellets, the equivalent diameter is defined as the diameter of a sphere having the same surface area as the non-spherical pellet.

The dewatered and dried PCM pellets 430 are transferred to a bagging hopper 490. Depending on pelletizer die 370 orifice size, rotation rate of the cutter knives 380, and pelletizer gear pump 330 flow rate, the typical size of pellets 430 may be between 0.1 mm and 5 mm in diameter. For most PCM applications, the preferred size is between about 0.5 mm and about 2 mm, where it is small enough for high heat transfer rate, but not too small to create handling problems. For example, this size range can easily be incorporated into the gypsum slurry used to make standard wallboards. The smaller the pellet, the higher the PCM surface area to volume ratio and the higher the rate of heat transfer.

The pellets 430 from the bagging hopper 490 are transferred to bags, drums, or other containers. The empty containers 510 are moved on a conveyor belt 500 to under the bagging hopper 490 and filled via fill valve 495. The filled containers 514 are then palletized (not shown) and moved to warehouse for distribution. The bagging or drumming operation may be automated or performed manually.

The PCM compounding and the continuous pelletizing process of the present invention are well-suited for process automation. The PCM pellets produced in this low cost production process are useful in diverse passive energy storage applications. These applications include, but are not limited to, building energy efficiency products (e.g. wallboards, attic insulation, and roof shingles), clothing, footwear, and furniture.

From the above description, it is clear that the present invention is well adapted to carry out the objects and to attain the advantages mentioned herein as well as those inherent in the invention. While a presently preferred embodiment of the invention has been described for purposes of this disclosure, it will be understood that numerous changes may be made which will readily suggest themselves to those skilled in the art and which are accomplished within the spirit of the invention disclosed and claimed herein.

What is claimed is:

1. A phase change material (PCM) pellet consisting essentially of
 a mixture of
  paraffin,
  a polymer, and
  optionally a thermal conductivity improver, a nucleating agent, an anti-oxidant, or a combination of any two or more thereof;
 wherein
  the paraffin is at least about 60 wt % of the PCM pellet; and
  the polymer is uncrosslinked high density polyethylene (HDPE) that has a melt flow index between about 0.1 g/10 min and about 50 g/10 min.

2. The PCM pellet of claim 1, wherein the paraffin is from about 60 wt % to about 90 wt % of the PCM pellet.

3. The PCM pellet of claim 1, wherein the uncrosslinked HDPE has a melt flow index between about 0.1 g/10 min and about 20 g/10 min.

4. The PCM pellet of claim 1, wherein the nucleating agent is from about 0 wt % to about 10 wt % of the PCM pellet, the thermal conductivity improver is from about 0 wt % to about 2 wt % of the PCM pellet, the anti-oxidant is from about 0 wt % to about 0.1 wt % of the PCM pellet, or combinations of any two or more thereof.

5. The PCM pellet of claim 1, wherein the mixture is a homogeneous mixture.

6. The PCM pellet of claim 1, wherein the paraffin includes n-octadecane.

7. The PCM pellet of claim 1, wherein the paraffin is produced by hydrodeoxygenation of lipids.

8. The PCM pellet of claim 1, wherein the PCM pellet is between 0.1 millimeter and 5 millimeters in diameter.

9. The PCM pellet of claim 1, wherein the PCM pellet is between 0.1 millimeter and 2 millimeters in diameter.

10. The PCM pellet of claim 1, wherein the paraffin has a melt point between about 10° C. and about 50° C.

11. The PCM pellet of claim 1, wherein the paraffin has a melt point between about 18° C. and about 28° C.

12. The PCM pellet of claim 1, wherein the paraffin has a heat of fusion between 100 and 240 J/g.

13. A phase change material (PCM) pellet consisting essentially of:
 a mixture of
  paraffin,
  a polymer, and
  optionally a thermal conductivity improver, a nucleating agent, an anti-oxidant, or a combination of any two or more thereof;
 wherein
  the paraffin is from about 60 wt % to about 90 wt % of the PCM pellet;
  the paraffin has a melt point between about 18° C. and about 28° C.; and
  the polymer is uncrosslinked high density polyethylene (HDPE) that has a melt flow index between about 0.1 g/10 min and about 20 g/10 min.

14. The PCM pellet of claim 13, wherein the nucleating agent is from about 0 wt % to about 10 wt % of the PCM pellet, the thermal conductivity improver is from about 0 wt % to about 2 wt % of the PCM pellet, the anti-oxidant is from about 0 wt % to about 0.1 wt % of the PCM pellet, or combinations of any two or more thereof.

15. The PCM pellet of claim 13, wherein the paraffin has a heat of fusion between 100 and 240 J/g.

16. The PCM pellet of claim 13, wherein the mixture is a homogeneous mixture.

17. The PCM pellet of claim 13, wherein the paraffin includes n-octadecane.

18. The PCM pellet of claim 13, wherein the paraffin is produced by hydrodeoxygenation of lipids.

19. The PCM pellet of claim 13, wherein the PCM pellet is between 0.1 millimeter and 5 millimeters in diameter.

20. The PCM pellet of claim 13, wherein the PCM pellet is between 0.1 millimeter and 2 millimeters in diameter.

21. A phase change material (PCM) pellet cosisting esstially of
 a mixture of
  paraffin,
  a polymer, and
  optionally a thermal conductivity improver, a nucleating agent, an anti-oxidant, or a combination of any two or more thereof
 wherein
  the paraffin is from 60 wt % to 90 wt % of the PCM pellet;
  the paraffin has a melt point from 10° C to 50° C and a heat of fusion from 100 to 240 J/g;
  the polymer is uncrosslinked high density polyethylene (HDPE) that has a melt flow index from 0.1 g/10 min to 50 g/10 min.

22. The PCM pellet of claim 21, wherein the uncrosslinked HDPE has a melt flow index from 0.1 g/10 min to 20 g./10 min.

23. The PCM pellet of claim 21, wherein the nucleating agent is from 0 wt% to 10 wt% of the PCM pellet, the thermal conductivity improver is from 0 wt% to 2 wt% of the PCM pellet, the anti-oxidant is from 0 wt% to 0.1 wt% of the PCM pellet, or combinations of any two or more thereof.

24. The PCM pellet of claim 21, wherein the mixture is a homogeneous mixture and the paraffin includes n-octadecane.

25. The PCM pellet of claim 21, wherein the PCM pellet is from 0.1 millimeter to 5 millimeters in diameter.

26. The PCM pellet of claim 21, wherein the PCM pellet is from 0.1 millimeter to 2 millimeters in diameter.

27. The PCM pellet of claim 21, wherein the paraffin has a melt point from 18° C. to 28° C.

* * * * *

UNITED STATES PATENT AND TRADEMARK OFFICE
CERTIFICATE OF CORRECTION

PATENT NO.         : 9,346,930 B2
APPLICATION NO.    : 14/754267
DATED              : May 24, 2016
INVENTOR(S)        : Ramin Abhari It is certified that error appears in the above-identified patent and that said Letters Patent is hereby corrected as shown below:

In the Claims

In Claim 21, Column 8, Rows 27-28, delete "cosisting esstially of" and insert --consisting essentially of-- therefore.

Signed and Sealed this
Ninth Day of August, 2016

Michelle K. Lee
*Director of the United States Patent and Trademark Office*